J. F. ROGERS.

Railway Car Axle.

No. 5,815.

Patented Sept. 26, 1848.

UNITED STATES PATENT OFFICE.

JOHN F. RODGERS, OF TROY, NEW YORK.

RAILROAD-CAR.

Specification of Letters Patent No. 5,815, dated September 26, 1848.

*To all whom it may concern:*

Be it known that I, JOHN F. RODGERS, of Troy, in the county of Rensselaer and State of New York, have invented a new and useful Improvement in the Axles of Railroad-Carriages; and the following is a full, clear, and exact description of the principle or character which distinguishes it from all other things before known and of the manner of making, constructing, and using the same, reference being had to the accompanying drawings, making part of this specification, in which—

Figure 2:
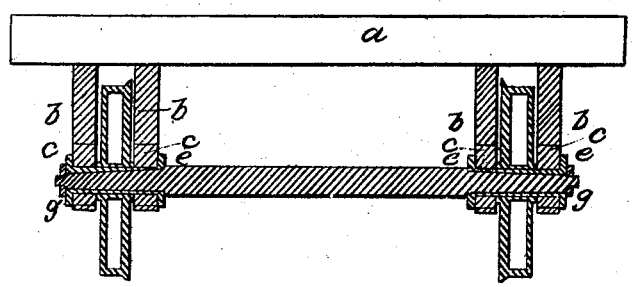
Figure 1:
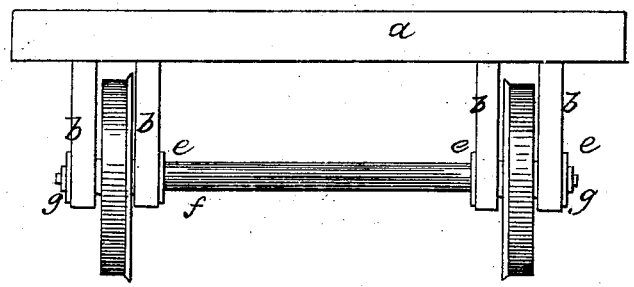

Figure 1 is an end elevation of a rail road truck with my improved axle, and Fig. 2, a vertical section taken in the plane of the axis of the axle.

The same letters indicate like parts in all the figures.

The importance of having the two wheels on each axle to turn independently of one another to allow of turning curves freely without the twisting of the axle, or slipping of the wheels on the rails, has long been recognized and admitted and the remedy often attempted, but all the plans heretofore assayed have failed of success for obvious reasons. Some have assayed a separate axle for each wheel, each axle extending entirely across the truck, which necessarily places the axis of one wheel back of that of the other, and gives too much weight; others have dispensed with the axle extending from one side to the other, by making a short axle for each wheel, with a bearing for the truck on each side, which failed for want of steadiness, the leverage of such short bearings not being sufficient to resist the leverage due to the semi-diameter of the wheel when the car surges from one side of the track to the other; and others again have resorted to the expedient of making the axle in two parts with a sleeve or a disk coupling in the middle, but this too failed for the same reason as the preceding.

The object of my invention is to accomplish this long desired object by a device which avoids the defects of the plans above enumerated, and the nature of my invention consists in making the hub of each wheel with two bearings for the truck and one on each side, when this is combined with an axle extending from a wheel on one side to a corresponding wheel on the opposite side, and passing through and fitted to the hubs thereof by a ground or otherwise formed close joints so that the hubs shall turn more freely in the boxes of the truck than on the axle. By this means the axle will give steadiness to the wheels and relieve the bearings on the hubs from the strain to which they would otherwise be exposed by the surging of the car from side to side of the track, and at the same time the twisting of the axle will be avoided by the turning of one or both of the hubs on the axle in passing around curves which it will effect with more facility than by the conical treads of the wheels as now generally practised, and without that severe strain on the rails known to be due to the conical tread of railroad wheels.

In the accompanying drawings (*a*) represents the frame of a railroad truck, and (*b*, *b*) the pedestals which pass down on each side of the wheels, instead of one side only as generally practised. These pedestals are provided, as in the usual manner, with boxes (*c*, *c*) which embrace journals (*d*, *d*) on each end of the hub (*e*) which is made of greater length than usual, or on a short axle inserted in and fastened to the hub. The hubs or short axles (*e*) are made hollow, and adapted to receive the ends of the axles (*f*) which are turned of a conical form and ground in to form snug joints that will turn only when the wheels are running on rails of different lengths as on curves, in which case one wheel must turn faster than the other. The ends of the axles are to be provided with washers and nuts (*g*, *g*) to prevent the hubs or hollow axles from slipping off.

From the above arrangement it will be seen that the wheels can turn independently of one another on the axle when passing around curves, but with more friction than is due to their turning in the boxes of the pedestals, but with sufficient ease to avoid twisting the axle. The tendency to break the axle is avoided by reason of having the weight supported on each side of the wheels, and the short bearings on each side of the wheels will be protected from overstrain and rendered steady by means of the axle. In this way the important and long since desired end is accomplished without encountering any of the objections which have been fatal to other devices heretofore applied to this purpose.

What I claim as my invention, and desire to secure by Letters Patent, is—

Supporting the truck on journals made each side of the wheels on the hubs or short axles, when this is combined with the long axle passing through the hubs or short axles, substantially as herein described and for the purpose specified.

JOHN F. RODGERS.

Witnesses:
CHAS. M. KELLER,
CH. L. FLEISCHMANN.